(12) United States Patent
Deschamps

(10) Patent No.: US 12,392,651 B2
(45) Date of Patent: Aug. 19, 2025

(54) SYSTEMS AND METHODS FOR DETERMINING SLUDGE LEVELS IN WASTEWATER RESERVOIRS

(71) Applicant: Drone Des Champs Inc., Laval (CA)

(72) Inventor: Nicolas Deschamps, Laval (CA)

(73) Assignee: DRONE DES CHAMPS INC., Lavel (CA)

( * ) Notice: Subject to any disclaimer, the term of this patent is extended or adjusted under 35 U.S.C. 154(b) by 466 days.

(21) Appl. No.: 17/743,844

(22) Filed: May 13, 2022

(65) Prior Publication Data

US 2022/0364899 A1 Nov. 17, 2022

Related U.S. Application Data

(60) Provisional application No. 63/188,328, filed on May 13, 2021.

(51) Int. Cl.

| | |
|---|---|
| *H04N 7/18* | (2006.01) |
| *B64D 1/02* | (2006.01) |
| *B64U 10/13* | (2023.01) |
| *G01F 23/00* | (2022.01) |
| *H04N 23/57* | (2023.01) |
| *B64U 101/00* | (2023.01) |
| *B64U 101/30* | (2023.01) |

(52) U.S. Cl.
CPC .......... *G01F 23/0023* (2013.01); *B64D 1/02* (2013.01); *B64U 10/13* (2023.01); *G01F 23/0038* (2013.01); *H04N 23/57* (2023.01); *B64U 2101/00* (2023.01); *B64U 2101/30* (2023.01)

(58) Field of Classification Search
CPC ...... H04N 23/57; H04N 7/18; G01F 23/0023; G01F 23/0038; B64U 10/13; B64U 2101/00; B64U 2101/30; B64D 1/02
USPC .......................................................... 348/82
See application file for complete search history.

(56) References Cited

U.S. PATENT DOCUMENTS

| | | | | |
|---|---|---|---|---|
| 4,719,359 A | * | 1/1988 | Rose ................... | G01F 23/0023 250/573 |
| 7,389,688 B1 | * | 6/2008 | Vander Horst ........ | G01F 23/02 73/299 |

(Continued)

FOREIGN PATENT DOCUMENTS

| | | |
|---|---|---|
| CN | 110441095 A | 11/2019 |
| CN | 109541164 B | 10/2021 |

(Continued)

*Primary Examiner* — Trang U Tran
(74) *Attorney, Agent, or Firm* — Merchant & Gould P.C.

(57) ABSTRACT

An aerially controlled sludge level detection system is for determining a sludge level in a wastewater reservoir. The system may have a drone and a sludge level detection tool suspended from the drone. The drone may be operable to lower the sludge level detection tool into the wastewater reservoir and raise the sludge level detection tool out of the wastewater reservoir. The sludge level detection tool may have a longitudinally extending gauge. At least a portion of the gauge at a distal end may be hollow to allow a volume of a fluid and a volume of the sludge from within the wastewater reservoir to enter the gauge when lowered into the wastewater reservoir. The sludge level detection tool may also have an analyzer connected to the gauge for analyzing the volume of the fluid and the volume of the sludge within the gauge.

22 Claims, 14 Drawing Sheets

(56) References Cited

U.S. PATENT DOCUMENTS

| | | | |
|---|---|---|---|
| 7,985,334 B2* | 7/2011 | Kopmeier | B01D 21/32 |
| | | | 210/207 |
| 9,606,028 B2 | 3/2017 | Detweiller et al. | |
| 10,338,608 B2 | 7/2019 | Wang | |
| 2017/0328814 A1 | 11/2017 | Castendyk et al. | |
| 2021/0223144 A1 | 7/2021 | Chosid | |

FOREIGN PATENT DOCUMENTS

| | | |
|---|---|---|
| EP | 2584355 B1 | 9/2015 |
| WO | 2016/082218 A1 | 2/2016 |

* cited by examiner

SYSTEMS AND METHODS FOR DETERMINING SLUDGE LEVELS IN WASTEWATER RESERVOIRS

This application claims the benefit of priority to U.S. Provisional Patent Application No. 63/188,328, filed May 13, 2021, and which application is incorporated herein by reference. To the extent appropriate, a claim of priority is made to the above application.

FIELD

The field of the invention relates to systems and methods for determining sludge levels in wastewater reservoirs.

INTRODUCTION

The following is not an admission that anything discussed below is part of the prior art or part of the common general knowledge of a person skilled in the art.

Wastewater treatment plants use information relating to sludge levels to determine if/when a wastewater reservoir (e.g., a basin, an aerated pond, or a non-aerated pond) is to be cleaned. Inaccurate measurements of sludge levels may result in a basin being prematurely cleaned. Prematurely cleaning a wastewater reservoir may have economic and environmental costs. Conversely, inaccurate measurements may result in a basin being cleaned too late, which may also trigger economic and environmental costs.

There are two known methods for determining sludge levels in a wastewater reservoir. The first method is to put a boat in the reservoir and try to navigate to a predetermined location and perform manual sampling with a traditional gauge or mud probe. These gauges or probes are sometimes called sludge samplers.

When using this method, an operator must be physically in the reservoir (i.e., on a boat floating on the surface of the liquid within the reservoir) which can pose significant risk. For example, the boat may capsize because the operator has to perform tasks that require moving on the boat (manipulating the various pieces of equipment, launch, etc.). In addition, in the presence of moderate to strong winds, it becomes very difficult to remain stationary. Not being able to remain stationary may be problematic because if the gauge is not lowered perpendicular to the surface of the liquid in the wastewater reservoir and/or if the boat moves during lowering and raising of the gauge, the measured results may be inaccurate. Accordingly, to use this method, a team of three or four people may be required which may incur considerable costs. It has been found that three to four people are needed as this provides a first operator to steer the boat, a second operator to take the sludge level measurements, and a third and optional fourth operator hold the boat in position (e.g., with ropes extending to the shore).

The second known method is to launch into the water a sonar/radar sensor that may be towed by, for example, a boat or a remote-controlled marine vehicle.

This second method may still pose risks to the operator as they must get close to the water when (a) launching the boat; (b) attaching the measurement equipment to the boat; (c) recovering the measurement equipment; and (d) recovering the boat. It has been found that the operator may be required to lift tens of kilos of equipment from the shore into the water, which may lead to injury to the operator. The risk of falling into the water may also be high. In addition, accessing the water's edge may pose a risk to the operator due to surrounding vegetation and uneven terrain. Further, as with the first method, the boat is sensitive to waves within the reservoir and movement of the boat and the equipment may lead to inaccurate measurements. Finally, it has been found that measuring by sonar/radar may produce inaccurate results due to the difficulty in calibrating the equipment required to make these measurements. It will also be apparent that the second method will not yield a physical sample of the water/sludge.

SUMMARY

This summary is intended to introduce the reader to the more detailed description that follows and not to limit or define any claimed or as yet unclaimed invention. One or more inventions may reside in any combination or sub-combination of the elements or process steps disclosed in any part of this document including its claims and figures.

In one aspect of this disclosure there is provided an aerially controlled sludge level detection system for determining a sludge level in a wastewater reservoir. The aerially controlled sludge level detection system may comprise a drone and a sludge level detection tool suspended from the drone. The drone may be operable to lower the sludge level detection tool into the wastewater reservoir and raise the sludge level detection tool out of the wastewater reservoir. The sludge level detection tool may have a longitudinally extending gauge extending from a proximal end located toward the drone and a distal end located away from the drone. At least a portion of the gauge at the distal end may be hollow to allow a volume of a fluid and a volume of the sludge from within the wastewater reservoir to enter the gauge when lowered into the wastewater reservoir. The sludge level detection tool may also have an analyzer connected to the gauge for analyzing the volume of the fluid and the volume of the sludge within the gauge.

DRAWINGS

For a better understanding of the described embodiments and to show more clearly how they may be carried into effect, reference will now be made, by way of example, to the accompanying drawings in which.

Figure 1A:
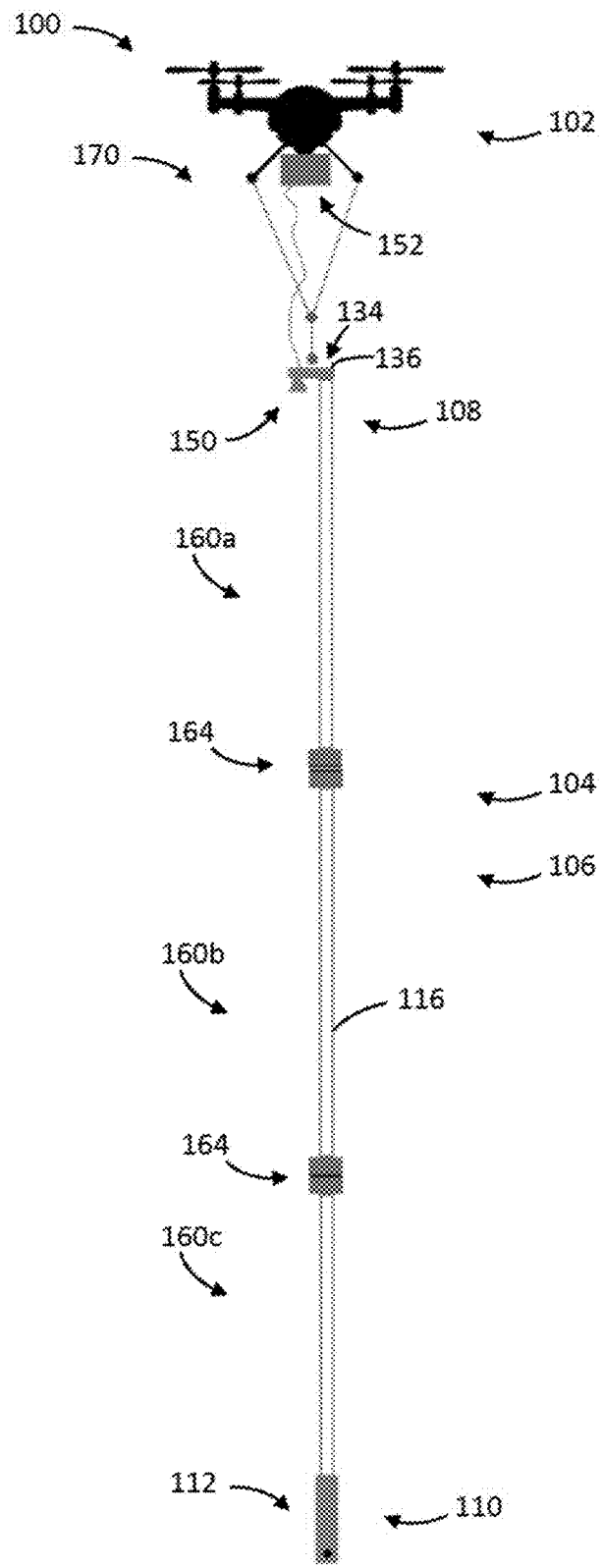
FIG. 1A is a front view of an aerially controlled sludge level detection system.

The drawings included herewith are for illustrating various examples of articles, methods, and apparatuses of the teaching of the present specification and are not intended to limit the scope of what is taught in any way.

DESCRIPTION OF VARIOUS EMBODIMENTS

Numerous embodiments are described in this application and are presented for illustrative purposes only. The described embodiments are not intended to be limiting in any sense. The invention is widely applicable to numerous embodiments, as is readily apparent from the disclosure herein. Those skilled in the art will recognize that the present invention may be practiced with modification and alteration without departing from the teachings disclosed herein. Although particular features of the present invention may be described with reference to one or more particular embodiments or figures, it should be understood that such features are not limited to usage in the one or more particular embodiments or figures with reference to which they are described.

The terms "an embodiment," "embodiment," "embodiments," "the embodiment," "the embodiments," "one or more embodiments," "some embodiments," and "one embodiment" mean "one or more (but not all) embodiments of the present invention(s)," unless expressly specified otherwise.

The terms "including," "comprising" and variations thereof mean "including but not limited to," unless expressly specified otherwise. A listing of items does not imply that any or all of the items are mutually exclusive, unless expressly specified otherwise. The terms "a," "an" and "the" mean "one or more," unless expressly specified otherwise.

As used herein and in the claims, two or more parts are said to be "coupled", "connected", "attached", or "fastened" where the parts are joined or operate together either directly or indirectly (i.e., through one or more intermediate parts), so long as a link occurs. As used herein and in the claims, two or more parts are said to be "directly coupled", "directly connected", "directly attached", or "directly fastened" where the parts are connected in physical contact with each other. As used herein, two or more parts are said to be "rigidly coupled", "rigidly connected", "rigidly attached", or "rigidly fastened" where the parts are coupled so as to move as one while maintaining a constant orientation relative to each other. None of the terms "coupled", "connected", "attached", and "fastened" distinguish the manner in which two or more parts are joined together.

As used herein and in the claims, a group of elements are said to "collectively" perform an act where that act is performed by any one of the elements in the group, or performed cooperatively by two or more (or all) elements in the group.

As used herein and in the claims, a first line or axis is said to be "perpendicular" to a second line or axis in three-dimensional space when the second line or axis is parallel to or collinear with an imaginary line that intersects the first line at a 90 degree angle, or within an angle of about 5 degrees of parallel to or collinear with the imaginary line.

As used herein and in the claims, a first element is said to extend "transverse" to a second element, where the first element extends within 45 degrees of perpendicular to the second element.

Some elements herein may be identified by a part number, which is composed of a base number followed by an alphabetical or subscript-numerical suffix (e.g., 112$a$, or 112$_1$). Multiple elements herein may be identified by part numbers that share a base number in common and that differ by their suffixes (e.g., 112$_1$, 112$_2$, and 112$_3$). All elements with a common base number may be referred to collectively or generically using the base number without a suffix (e.g., 112).

It should be noted that terms of degree such as "substantially", "about", and "approximately" as used herein mean a reasonable amount of deviation of the modified term such that the result is not significantly changed. These terms of degree may also be construed as including a deviation of the modified term, such as by 1%, 2%, 5% or 10%, for example, if this deviation does not negate the meaning of the term it modifies.

Furthermore, the recitation of numerical ranges by endpoints herein includes all numbers and fractions subsumed within that range (e.g., 1 to 5 includes 1, 1.5, 2, 2.75, 3, 3.90, 4, and 5). It is also to be understood that all numbers and fractions thereof are presumed to be modified by the term "about" which means a variation of up to a certain amount of the number to which reference is being made if the end result is not significantly changed, such as 1%, 2%, 5%, or 10%, for example.

General Description of an Aerially Controlled Sludge Level Detection System

Referring first to FIG. 1A, shown therein is an example of an aerially controlled sludge level detection system 100. As shown, the system 100 may include a drone 102 for transporting a suspended sludge level detection tool 104 to a predetermined location. The drone 102 may have any design suitable for transporting the sludge level detection tool 104. In the example shown, the drone 102 is a multi-rotor drone.

More specifically, the drone 102 may be operable transport the sludge level detection tool 104 between a launch site and a measurement site. When positioned above the measurement site, the drone 102 may be operable to lower the sludge level detection tool 104 generally along a measurement site axis into the wastewater reservoir (specifically into a liquid within the wastewater reservoir) and raise the sludge level detection tool 104 generally along the measurement site axis out of the wastewater reservoir (specifically out of the liquid within the wastewater reservoir).

The drone 102 may be operable hold the position of the sludge level detection tool 104 within 10 cm, optionally between 1 cm and 2 cm of the measurement site axis when raising and lowering the sludge level detection tool 104. It has been found that the drone 102 may hold the position within 1 cm and 2 cm even in the presence of winds up to 30 km/h Further, the drone 102 may be operable to raise and lower the sludge level detection tool 104 at a constant speed. It has been found that lowering the sludge level detection tool 104 at a constant speed may improve the accuracy of the sludge level measurement.

Use of a drone 102 to transport the sludge level detection tool 104 between the launch site and the measurement site may prevent an operator from having to approach the wastewater reservoir. That is, the entire operation may be directed from a bank, so long as compliance with local regulations regarding the use of drones may be maintained. Further, since there is no vessel on the surface of the liquid to be sampled, propulsion problems caused by suspended algae may be resolved and the surface of the liquid to be sample may be minimally disturbed.

Sludge Level Detection Tool

Figure 2A:
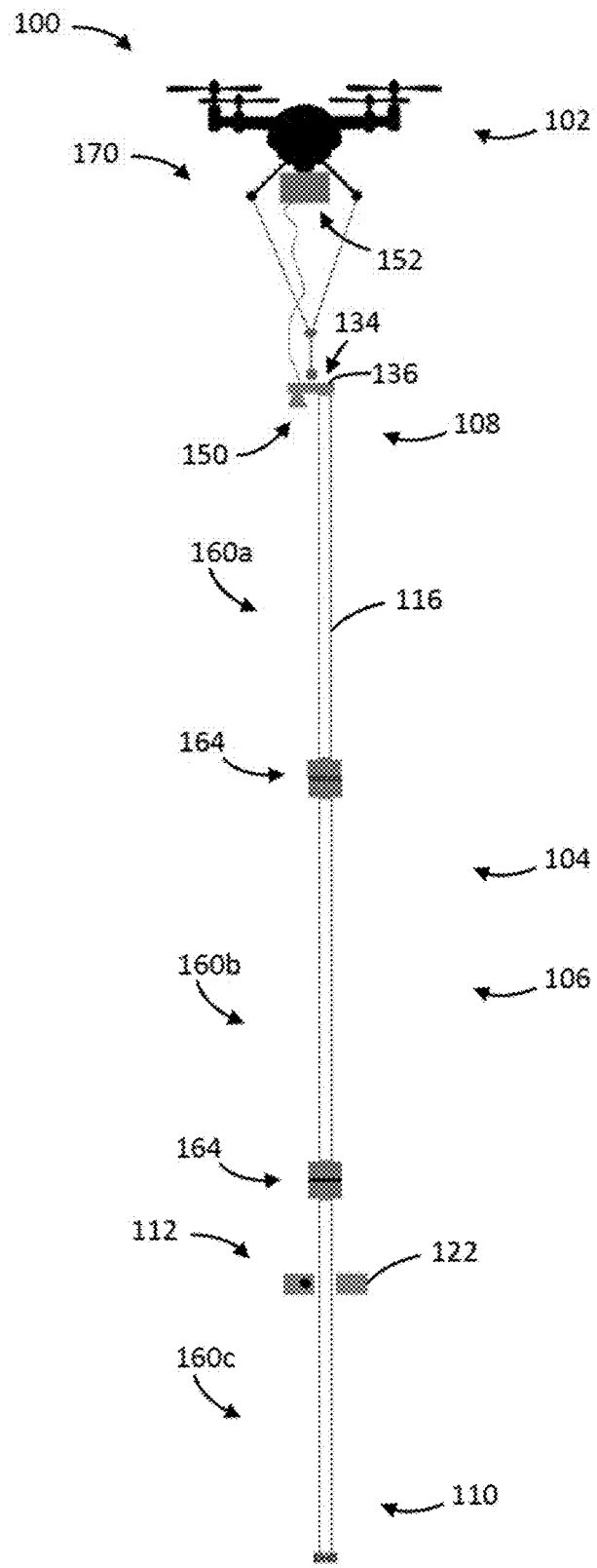
FIG. 2A is a front view of an alternative embodiment of a sludge level detection system.

The sludge level detection tool 104 may be any sludge level detection tool 104 suitable for measuring the amount of sludge within a wastewater reservoir. As shown in FIGS. 1A and 2A, the sludge level detection tool 104 may be suspended from a drone 102. Accordingly, the drone 102 may transport the sludge level detection tool 104 between a launch site and a measurement site.

In the examples illustrated in FIGS. 1A and 2A, the sludge level detection tool 104 has a longitudinally extending gauge 106. As shown, the longitudinally extending gauge 106 may have a proximal end 108 positioned toward the drone 102 when suspended by the drone 102 and a distal end 110 positioned away from the drone 102 when suspended by the drone 102.

At least a portion of the gauge 106 may be hollow to allow a volume of the fluid and a volume of the sludge within the wastewater reservoir to enter the gauge 106 when lowered into the wastewater reservoir. In the example illustrated in FIGS. 1A and 2A, the entire length of the gauge 106 between the proximal end 108 and the distal end 110 is hollow. That is, in the examples illustrated, the gauge 106 is tubular. In alternative embodiments, only a portion of the gauge 106 which includes at least the distal end 110 may be hollow. It will be appreciated that the hollow portion may include the distal end 110 to allow the volume of fluid and the volume of sludge to enter the gauge 106 as the gauge 106 is lowered into the wastewater reservoir.

The gauge 106 may further include a port 134 that extends between an outer surface 116 of the gauge 106 and a cavity defined by the hollow portion of the gauge. The port 134 may allow air to vent from the cavity during lowering of the sludge level detection tool 104 into the wastewater reservoir. The port 134 may have any size and shape suitable to vent air from the cavity. The port 134 may be located at any position along the outer surface 116 of the gauge 106.

In some examples, the port 134 may be positioned at the proximal end 108 of the gauge 106. In the example illustrated in FIGS. 1A and 2A, the gauge 106 is tubular and accordingly includes a port 134 in an upper surface 136 of the proximal end 108 thereof. When positioned at the proximal end 108 (or toward the proximal end 108), the port 134 may remain above the surface of the liquid within the wastewater reservoir as the sludge level detection tool 104 is lowered into the wastewater reservoir. Keeping the port 134 about the surface of the liquid may limit the production of turbulence and/or bubbles within the wastewater reservoir as the sludge level detection tool 104 is being lowered into the wastewater reservoir. It may be describable to limit the amount of turbulence and/or bubbles generated in the wastewater reservoir as the sludge level detection tool 104 is being lowered into the wastewater reservoir as the turbulence and/or bubbles may mix the liquid and the sludge, which may result in an inaccurate measurement being made.

As shown in FIGS. 1A and 2A, an analyzer 112 may be connected to the gauge 106 for analyzing the volume of the fluid and the volume of the sludge within the gauge 106. Any analyzer 112 suitable to analyze the volume of the fluid and the volume of the sludge within the gauge 106 may be used.

Figure 1B:
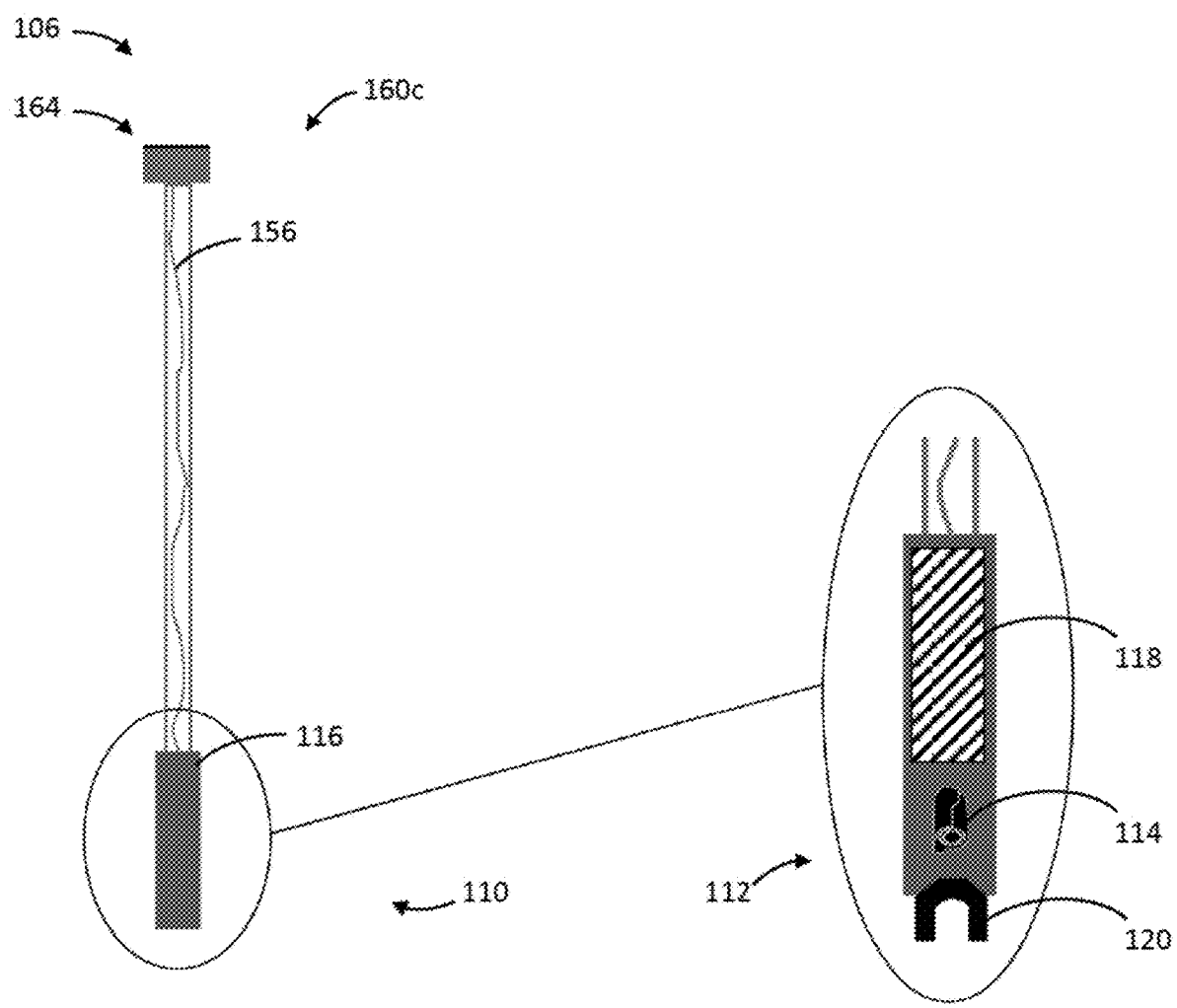
FIG. 1B is an enlarged view of a lower segment of a gauge of a sludge level detection tool of the aerially controlled sludge level detection system of FIG. 1A.

Referring now to FIG. 1B, in the example illustrated, the analyzer 112 is a camera 114. As shown in FIG. 1B, the camera 114 may be positioned within the hollow portion of the gauge 106. Alternatively, the camera 114 may be positioned on the outer surface 116 of the gauge 106. While FIG. 1B shows a single camera 114, it will be appreciated that multiple cameras 114 (or alternative analyzers) may be used.

The camera 114 may be operable to take images at a predetermined interval (i.e., time interval or depth interval based on the descent of drone) as the sludge level detection tool 104 is lowered into the wastewater reservoir. Accordingly, in some examples, based on the subject matter of the image, a time stamp of the image, and knowledge of the speed that the sludge level detection tool 104 is being lowered into the wastewater reservoir by the drone 102, (a) the sludge level (i.e., thickness of the sludge) may be determined; and (b) the depth of the sludge from the surface of the liquid within the wastewater reservoir may be determined.

For example, if the sludge level detection tool 104 is inserted into the wastewater reservoir at t=0 and at a speed of 10 cm/second, and at t=100 seconds the camera 114 takes an image just above the surface of the sludge, it can be determined that the sludge is 1000 cm below the surface of the liquid. Further, if at t=150 the camera 114 takes an image just above the lower surface of the reservoir (or the sludge level detection tool stops descending into the wastewater reservoir because it has reached the lower surface of the wastewater reservoir), it can be determined that the sludge level is 500 cm.

As a second example, if the camera 114 takes an image every 1 cm of descent of the drone 102, begins taking images just as the distal end 110 of the gauge 106 contacts the upper surface of the liquid within the wastewater reservoir, and the $1000^{th}$ image is an image just above the upper surface of the sludge, it can be determined that the upper surface of the sludge is 1000 cm below the upper surface of the liquid.

Optionally, the sludge level detection tool 104 may include a light (not shown) to illuminate a field of view of the camera 114. As shown in FIG. 1B, the sludge level detection tool 104 may include a weight 118 at the distal end 110 of the gauge 106 to help urge the sludge level detection tool 104 into and through the sludge. It will be appreciated that the weight 118 should not be so heavy to pose high levels of stress on the drone 102 and other elements of the sludge level detection system 100.

Still referring to FIG. 1B, the sludge level detection tool 104 may include an infrared probe 120 at the distal end 110 thereof. Similar to the camera 114, the infrared probe 120 may be operable to detect the upper surface of the sludge and/or lower surface of the wastewater reservoir. While the example shown in FIG. 1B shows a sludge level detection tool 104 having both an infrared probe 120 and a camera 114, it is to be understood that the sludge level detection tool 104 may have only one of the camera 114 and the infrared probe 120.

Whether in the first or second example, the infrared probe 120 is used to deduce a measure of turbidity of the water, as is known in the art. However, other sensor that would achieve a measure of turbidity are within the scope of the present invention.

In a preferred embodiment, the sludge level detection tool is further provided with a pressure sensor 133. The pressure sensor 133 is adapted to measure the pressure as the tool 104 is lowered into the water. Advantageously, the combination of pressure data and infrared data (indicative of turbidity) reveals the precise location of sludge. It will be apparent that the depth can be deduced from the difference in pressure above the water level and in the water.

In addition, combining readings from an infrared sensor and a pressure sensor increases the precision of the measurements, and provides a redundant measuring system in case of failure of one or the other of the sensors.

Total depth of the basin is advantageously obtained by combining data from the pressure sensor and the optionally included sonars.

Figure 2B:
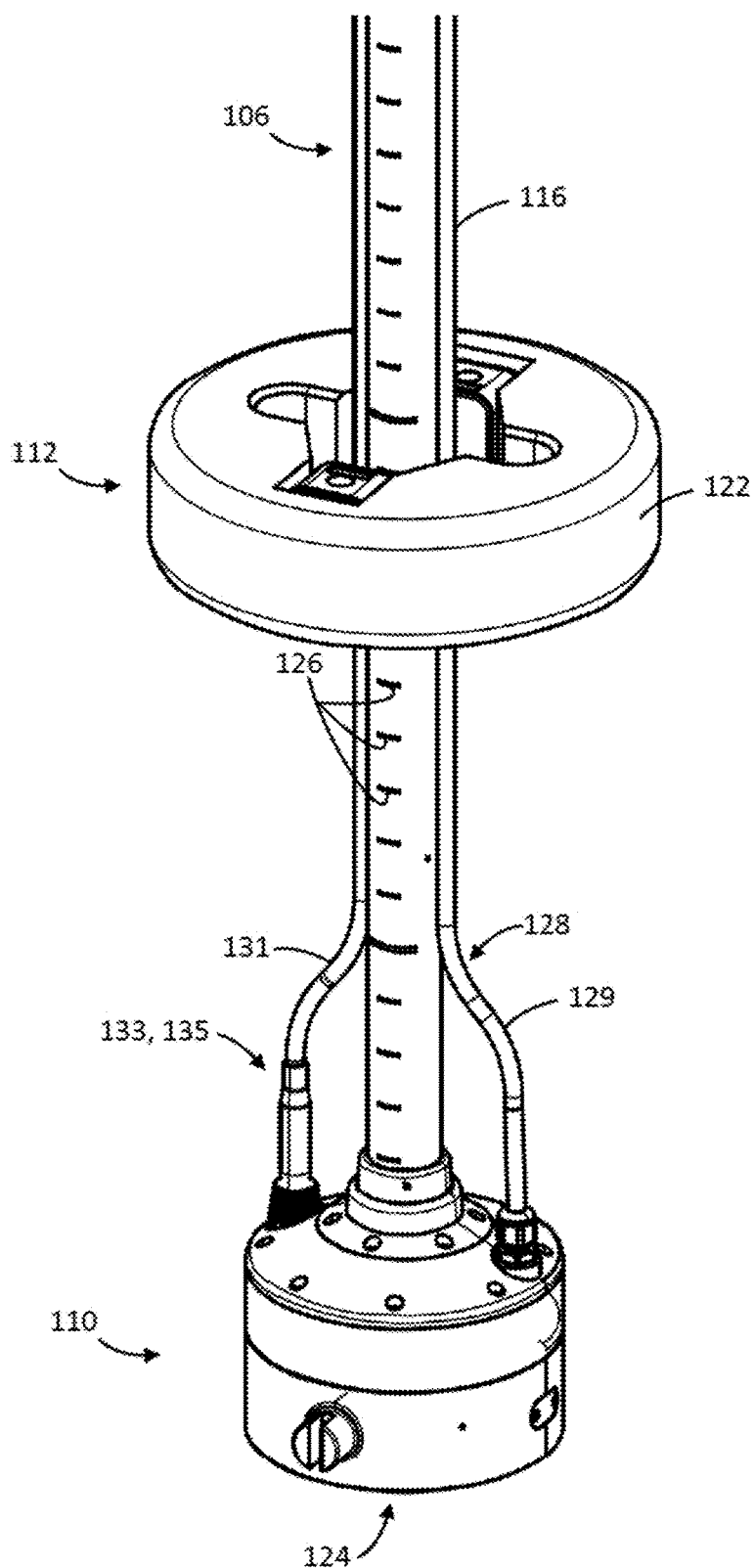
FIG. 2B is an enlarged view of a lower segment of a gauge of a sludge level detection tool of the aerially controlled sludge level detection system of FIG. 2A.

Referring now to FIGS. 2A and 2B, a second example of an analyzer 112 is shown. In the example illustrated, the analyzer 112 is a float-camera 122 that is slidably mounted to the outer surface 116 of the gauge 106. The float-camera 122 may float on an upper surface of the fluid within the wastewater reservoir when the gauge 106 is lowered into the wastewater reservoir by the drone 102 and when the gauge 106 is raised out of the wastewater reservoir. It will be appreciated that the gauge 106 may have a stop 128 at the distal end 110 thereof to reduce the likeliness of the float-camera 122 sliding off the distal end 110 of the gauge 106. As illustrated, the stop 128 results in the configuration of the power conduit 129 and conduit for sensors 133, 135. The float-camera 122 may be slidable along the entire length of the gauge 106. Optionally, the sludge level detection tool 104 may include a light (not shown) to illuminate a field of view of the float-camera 122.

In a preferred embodiment, float-camera 122 is provided with a power source that is independent of the power provided by the drone 102. An independent power source obviates the need for additional wiring from the drone 102 to the float-camera 122, which could prevent float-camera 122 from sliding along the gauge 106.

To measure the sludge level using the float-camera 122 shown in FIG. 2B, the gauge 106 may capture a volume of the fluid and a volume of the sludge (i.e., collect a sample) and present that sample to the float-camera 122 so that the float-camera 122 may determine (a) the sludge level; and (b) the depth of the sludge from the surface of the liquid within the wastewater reservoir.

More specifically, as shown in FIG. 2B, FIGS. 6A-6D and FIG. 7, the distal end 110 of the gauge 106 may include a valve 124. With the valve 124 in an open position, the gauge 106 may be lowered into the wastewater reservoir. As the gauge 106 is lowered into the wastewater reservoir with the valve 124 in the open position, a volume of the liquid will start to flow into the hollow portion of the gauge 106. At a certain depth, the gauge 106 will reach the sludge and may continue to be lowered through the sludge. Accordingly, the sludge may continue to flow into the hollow portion of the gauge 106. Once the gauge 106 reaches the bottom of the wastewater reservoir, the valve 124 may be closed, capturing a sample within the gauge 106.

With the sample captured in the gauge 106, the drone 102 may raise the gauge 106 out from the wastewater reservoir. While the gauge 106 is raised, the float-camera 122 may remain on the surface of the liquid within the wastewater reservoir. Accordingly, the float-camera 122 may take images along the length of the gauge 106 that was submerged. It will be appreciated that the images may be analyzed to determine (a) the sludge level; and (b) the depth of the sludge from the surface of the liquid within the wastewater reservoir.

As shown in FIG. 2B, the gauge 106 may have graduated markings 126 at regular intervals along the gauge 106. Accordingly, if the graduated markings 126 provide a distance to the distal end 110 of the gauge 106, and an image shows the transition from sludge to liquid at graduated marking "500 cm", the depth of the sludge can be determined to be 500 cm. It will be appreciated that if a first image shows the transition from liquid to air at graduated marking "1500 cm" and a second image shows the transition from liquid to sludge at graduated marking "500 cm", the depth of the sludge from the surface of the liquid within the wastewater reservoir can be determined to be 1000 cm.

In some examples, an opening 130 defined by the valve 124 may be equal to or greater than an inner diameter 132 of the gauge 106.

An example of a valve 124 is shown in FIGS. 6A, 6B, 6C, 6D and 7. In the example illustrated, the gauge 106 comprises a section 201 shaped and sized to be inserted into opening 130, which longitudinally extends from a bottom 131 to a top 133 of the valve 124. This section 201 of the gauge 106 is preferably flexible, yet resilient to retain its original generally cylindrical shape, as will be apparent hereinafter.

The valve 124 is provided with a clamping system 210. In the illustrated embodiment, clamping system 210 consists of two opposite clamps 211, 213, adapted to translate longitudinally along axis L (see FIG. 6B). Clamps 211, 213 have opposing, parallel faces 215, 217. Clamps 211, 213 are movable between an open position shown in FIG. 6B, and a closed position shown in FIG. 6D, by actuators 219 driving a sprocket wheel 221 engaging a toothed portion 223 on the clamps 211, 213. In a preferred embodiment, the actuators 219 are step motors.

Figure 6A:
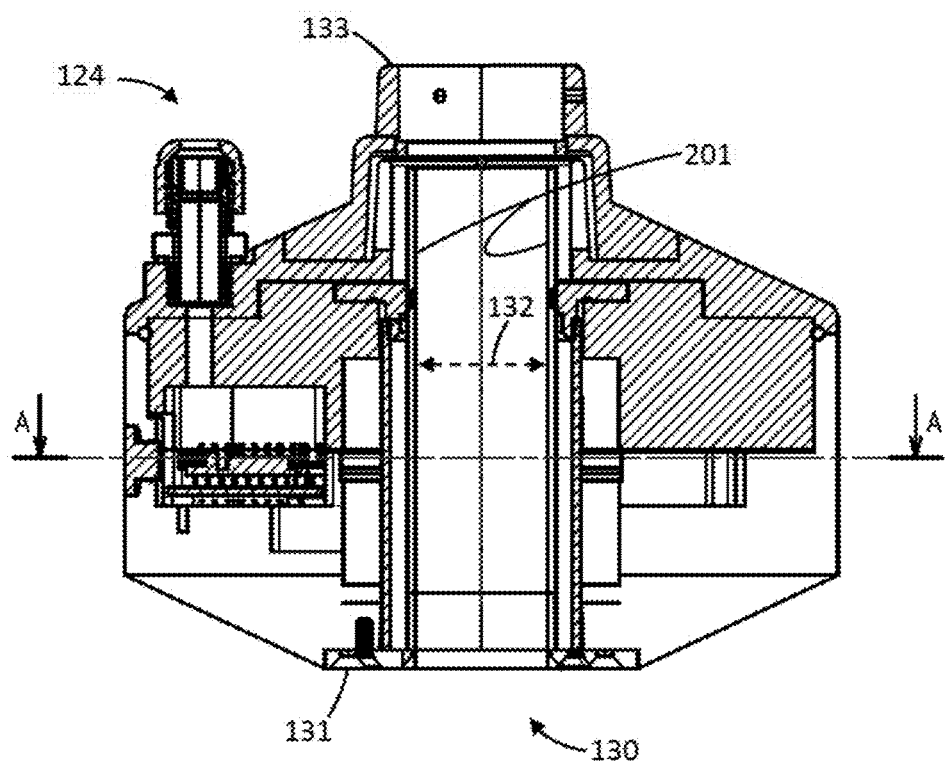
FIG. 6A is a cross-sectional side view of a valve for controlling the flow of a volume of a liquid and/or a volume of sludge into and/or out of a gauge of a sludge level detection tool of a sludge level detection system, without a clamping system.
Figure 6B:
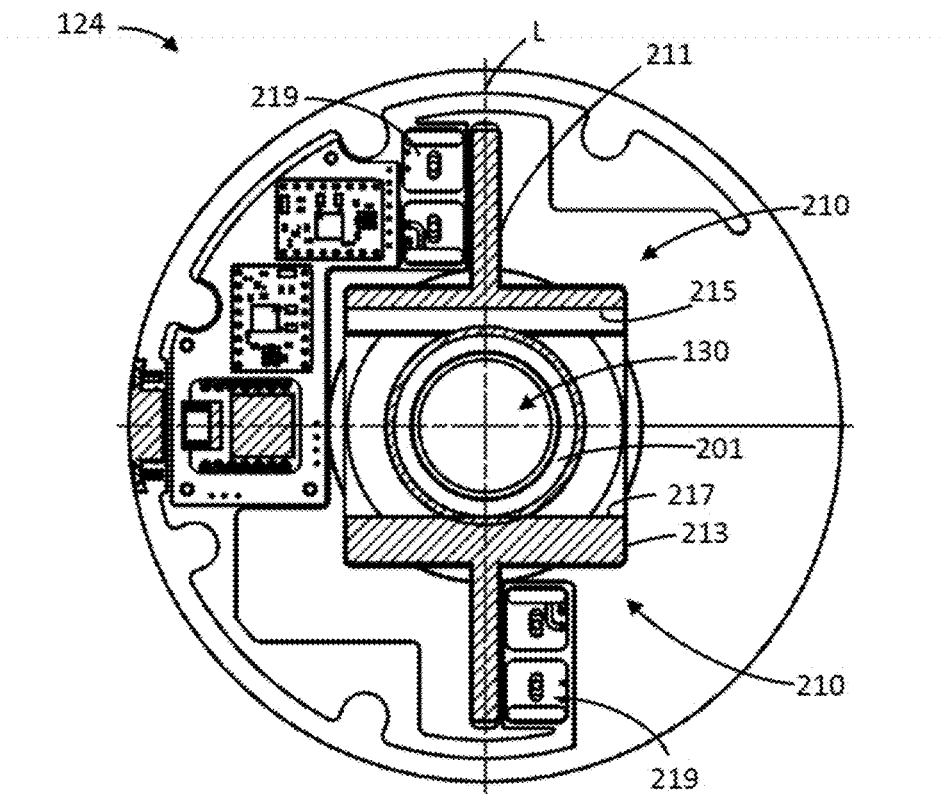
FIG. 6B is a cross-sectional top view of the valve of FIG. 6A, taken along line A-A in FIG. 6A with the clamping system in an open position.
Figure 6C:
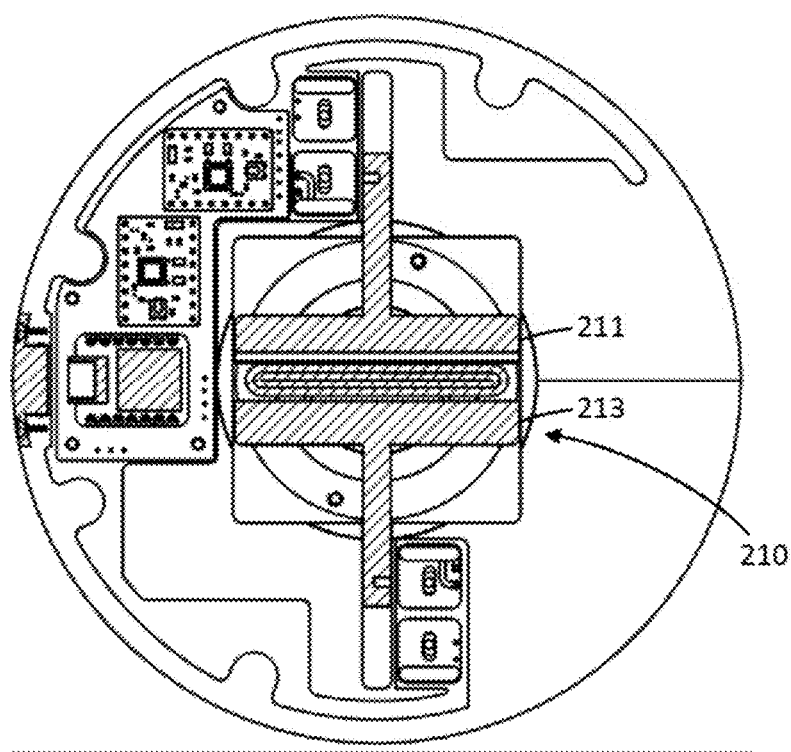
FIG. 6C is a cross-sectional top view of the valve of FIG. 6A, taken along line A-A in FIG. 6A, with the clamping system in a closed position.
Figure 6D:
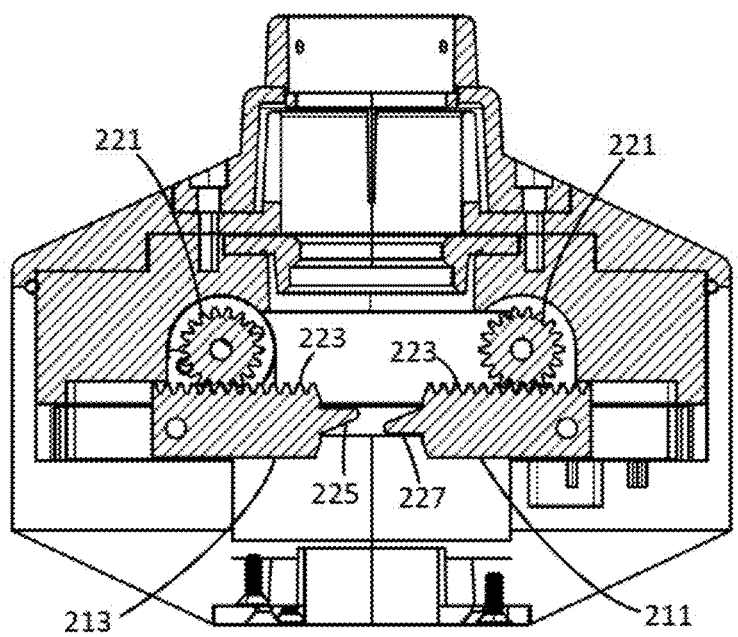
FIG. 6D is a cross-sectional side view of a valve similar to FIG. 6A, showing the clamping system.
Figure 7:
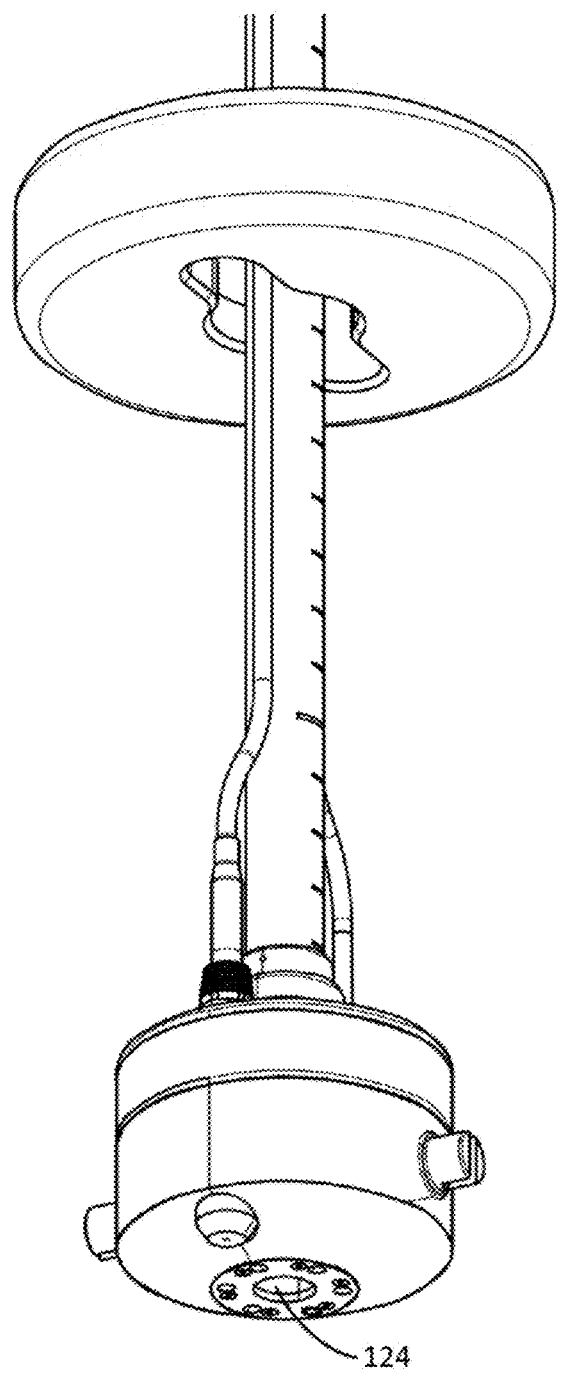
FIG. 7 is a bottom perspective view of the valve of FIG. 6A.

The opposing parallel faces 215, 217 can be any shape, such as a flat shape in order to clamp therebetween the section 210 of the gauge 106 to prevent flow of a liquid (see FIG. 6C). The opposite parallel faces 215, 217 can be of any shape to prevent flow of a liquid. In a preferred embodiment, the opposite faces have a shape which resembles a shiplap joint, i.e. having a pair of lips 225, 227 shaped and sized to be one on top of the other (see FIG. 6D), so that when the clamps 211, 213 are closed, the lips 225, 227 cooperate to clamp the section 201 both laterally and vertically, effectively sealing the section 201.

It will also be understood that although clamps 211, 213 are illustrated as being both translatable, a person skilled in the art will recognize that it may be possible to have one clamp fixed to the valve 124, the other valve being adapted to move between the open and closed positions. The length of movement will of course be greater in this configuration for the moveable clamp 211 or 213, and the actuator 219 will be selected accordingly.

It will also be appreciated by a person skilled in the art that although a clamp-style valve has been illustrated and described, any other type of valve will meet the objects of the present invention, which is to permit ingress of the water or fluid into the gauge 106 as the gauge 106 is lowered into the body of water, and to then close the gauge once the requisite depth has been reached, to allow removal of the gauge 106 from the water with a sample of water within the gauge 106.

The configuration disclosed in both embodiments places the valve 124 at the bottom of the gauge 106. This configuration is the configuration that is preferred, however it will be apparent to a person skilled in the art that instead of closing the bottom of the gauge, one could make use of the negative pressure in the gauge 106 itself. In other words, the valve can be located at the top of the gauge 106, and normally in an open position. When a sufficient depth has been reached, the valve may be closed. The presence of water/liquid/sludge at the bottom of the gauge 106 combined with a closed top of the gauge creates a negative pressure within the gauge 106, preventing the liquid from escaping. It will also be apparent that this alternative configuration requires a highly effective seal in the region of the valve 124, as well as effective seals throughout the gauge itself, and especially at the regions where different sections interconnect.

Optionally, an artificial intelligence image recognition system may be implemented to analyze the images taken by the camera 114 and/or float-camera 122. Image data of individual sampling points may be retained for further examination and additional training of the artificial intelligence image recognition system.

While the drawings show examples of sludge level detection tools 104 having analyzers 112 configured as optical cameras (i.e., camera 114 and float-camera 122), it is to be understood that other analyzers 112 may be used. In addition, detection tool 104 may be supplemented with one or more of the following sensors: GPS module; pressure sensor; turbidity sensor; pH sensor; gyroscope. Further it is to be understood that a sludge level detection tool 104 may include multiple analyzers 112.

Figure 2C:
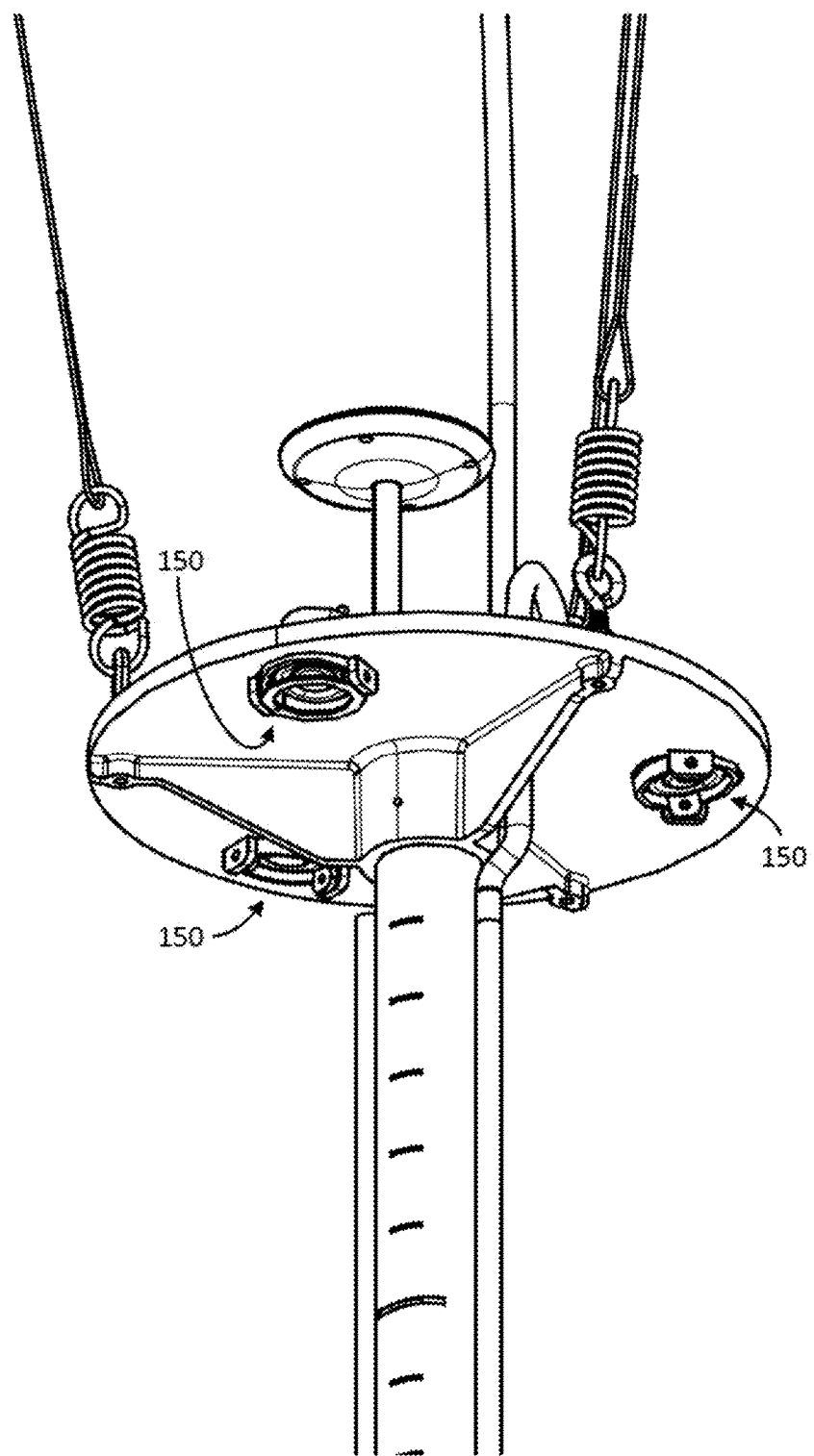
FIG. 2C is an enlarged view of an upper segment of the gauge of the sludge level detection tool of the aerially controlled sludge level detection system of FIG. 2A.

Referring now to FIG. 2C, and as alluded to above, the sludge level detection tool 104 may include at least one distance sensor 150. Any distance sensor 150 suitable for determining the distance of the distance sensor 150 from the upper surface of the liquid in the wastewater reservoir may be used (e.g., an ultrasonic sensor or an acoustic sensor). In the example shown, the at least one distance sensor 150 is three sonar sensors.

The distance sensor 150 may signal the drone 102 (directly or indirectly) to stop lowering the sludge level detection tool 104 if the distance sensor 150 detects that the upper surface of the fluid within the wastewater reservoir is within a threshold limit. The threshold limit may be between 0 and 80 meters. It may be desirable to signal the drone 102 to stop lowering the sludge level detection tool 104 to reduce the likeliness of crashing the drone 102 into the liquid within the wastewater reservoir.

Optionally, the distance sensor 150 may be positioned 30 m above the liquid within the wastewater reservoir and be able to determine the distance between the distance sensor 150 and the upper surface of the liquid within 1 cm. Optionally, the distance sensor 150 may be waterproof.

Figure 5:
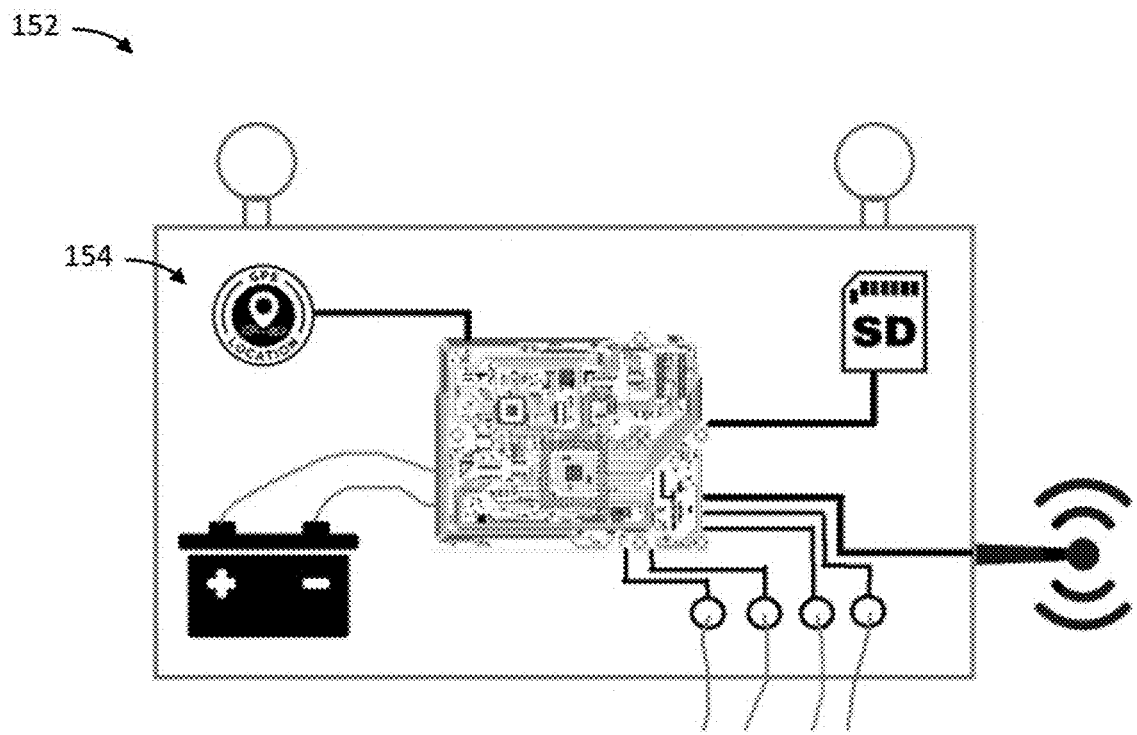
FIG. 5 is schematic illustration of a control module.

Referring now to FIG. 5, the sludge level detection system may include an on-board control module 152. As shown, the control module 152 may be an embedded computer. The control module 152 may (a) allow an operator to perform visual control of the information by transmitting the information captured by the analyzer(s) and/or sensor(s); (b) allow an operator, in case of problems or fault conditions (e.g., dirty optics) to perform appropriate remedial actions; (c) save the collected information measured by the analyzer(s) and/or sensor(s) for immediate or future analysis; (d) calculate (i) the sludge level; and/or (ii) the depth of the sludge from the surface of the liquid within the wastewater reservoir by processing the data collected by the analyzer(s), in real time or offline; (e) time-stamp the data collected by the analyzer(s); and/or (f) track the location of the drone 102 via an on-board GPS 154.

The control module may include a wireless transceiver to send data collected by the analyzer(s) and/or sensor(s) to a control system and to receive control signals (e.g., data collection rates, signal to start/stop data collection, etc.). Alternatively, or in addition, the analyzer(s) may include on-board memory for storing collected data. The data stored in the on-board memory may be transferable to the control system via an optional data transfer port or wireless communication.

Optionally, the control module may be provided with a telemetry system to provide video feedback to a ground station visible to the operator at all times.

As shown in the example illustrated in FIG. 2A, the control module 152 may be attached to the drone 102. The control module 152 may be wirelessly or wiredly connected to the analyzer(s) and/or sensors(s). In alternative embodiments, the control module 152 may be positioned along the gauge 106 or be included within the analyzer(s) and/or sensor(s).

The analyzer(s) (e.g., camera 114 or float-camera 122) may be powered by batteries located proximate the analyzer(s) and/or by batteries located proximate the drone 102 and connected by power supply cables 156 that extend along (e.g., within) the gauge 106 (see, e.g., FIG. 1B).

Referring back to FIG. 2A, as shown, the gauge 106 may comprise multiple longitudinally extending segments 160. In the example illustrated, the gauge 106 consists of three segments 160, an upper segment 160a, an intermediate segment 160b, and a lower segment 160c. It is to be understood that the gauge 106 may comprise any number of segments 160 (e.g., 2, 10, 100).

Figure 3:
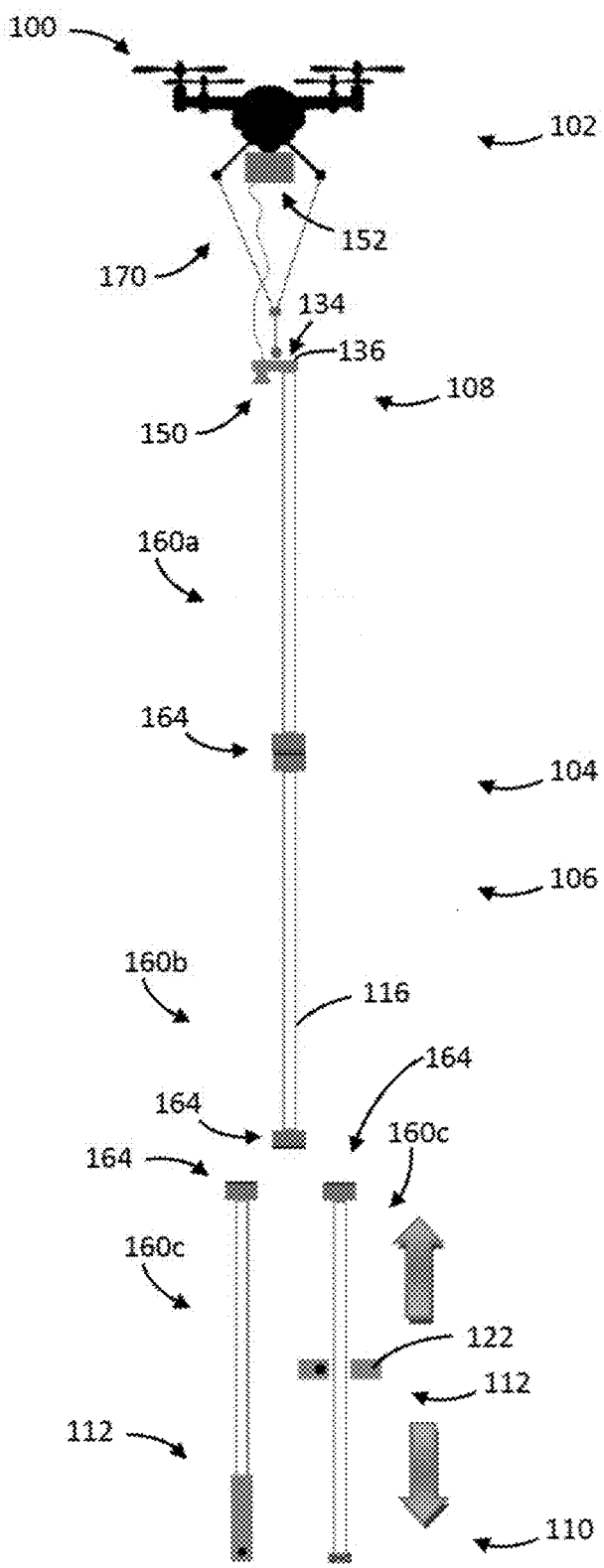
FIG. 3 is a front view of an alternative embodiment of a sludge level detection system.

It may be desirable for the gauge 106 to be formed of multiple segments 160 as opposed to a single workpiece to allow for customization of the sludge level detection tool 104 based on the needs of the operator. For example, the length of the gauge 106 may be extended or reduced by the addition or removal of segments 160. As a second example, as shown in FIG. 3, the analyzer 112 may be interchanged based on the desired use of the sludge level detection tool 104. It is to be understood that the gauge 106 may not comprise multiple segments 160.

As described above, at least a portion of the gauge 106 may be hollow so that the sludge level detection tool 104 may capture a sample of liquid and sludge. Optionally, the portion of the gauge 106 that is hollow may extend across multiple segments 160. In the example illustrated, each of the upper segment 160a, intermediate segment 160b, and lower segment 160c are hollow and liquid and sludge may pass from the lower segment 160c into the intermediate segment 160b and from the intermediate segment 160b into the upper segment 160a (i.e., the segments 160 may be in fluid communication).

Figure 2D:
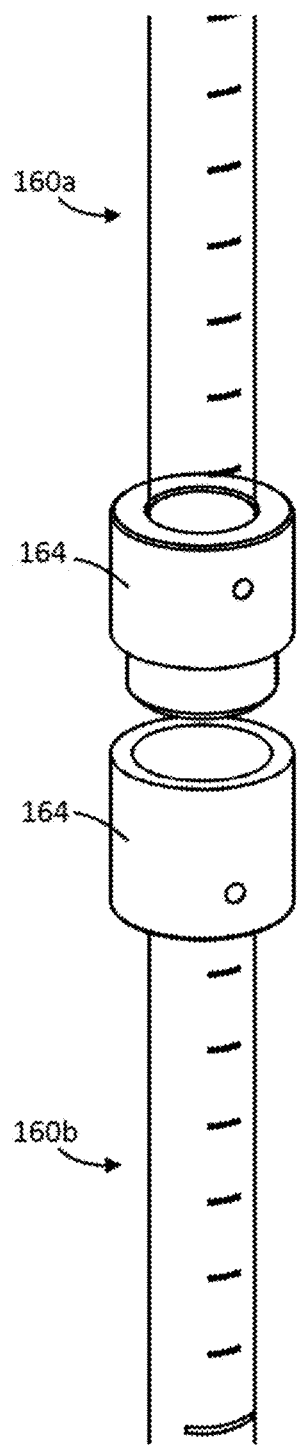
FIG. 2D is an enlarged view of an intermediate segment of the gauge of the sludge level detection tool of the aerially controlled sludge level detection system of FIG. 2A.

Referring now to FIG. 2D, an example of the junction of two segments 160a, 160b. In the example illustrated, the intermediate segments 160a and 160b have quick connect couplers 164 for attaching the segments 160a and 160b together. The quick connect couplers 164 may have any design suitable for connecting adjacent segments 160. It will be appreciated that the quick connect couplers 164 may (a) facilitate fluid communication of adjacent segments 160; and/or (b) not interfere with the float-camera 122 as it slides along the outer surface 116 of the gauge 106.

Alternatively, the inside diameter of the float-camera 122 may be configured to be greater than an outside diameter of the guick-connect couplers 164.

While not shown in the drawings, a liquid reservoir may be fluidically connected to the hollow portion of the gauge 106. Fluid may be released from the liquid reservoir to clean out the gauge 106 after a sludge level measurement has been made. Accordingly, a sludge level detection system 100 may perform multiple sludge level measurements without having to return the drone 102 the launch site. The liquid reservoir may be located at any position along the system 100.

Optionally the liquid reservoir may be connected to the drone 102. Optionally, the liquid reservoir may be fluidically connected with the proximal end 108 of the gauge 106. Release of liquid from the liquid reservoir may be remote actuated. In some examples, the liquid reservoir may hold up to 10-litres of liquid.

Suspension Device

As described above, the sludge level detection tool 104 may be suspended from a drone 102. Any suspension device 170 suitable for connecting the sludge level detection tool 104 to the drone 102 may be used.

Figure 4A:
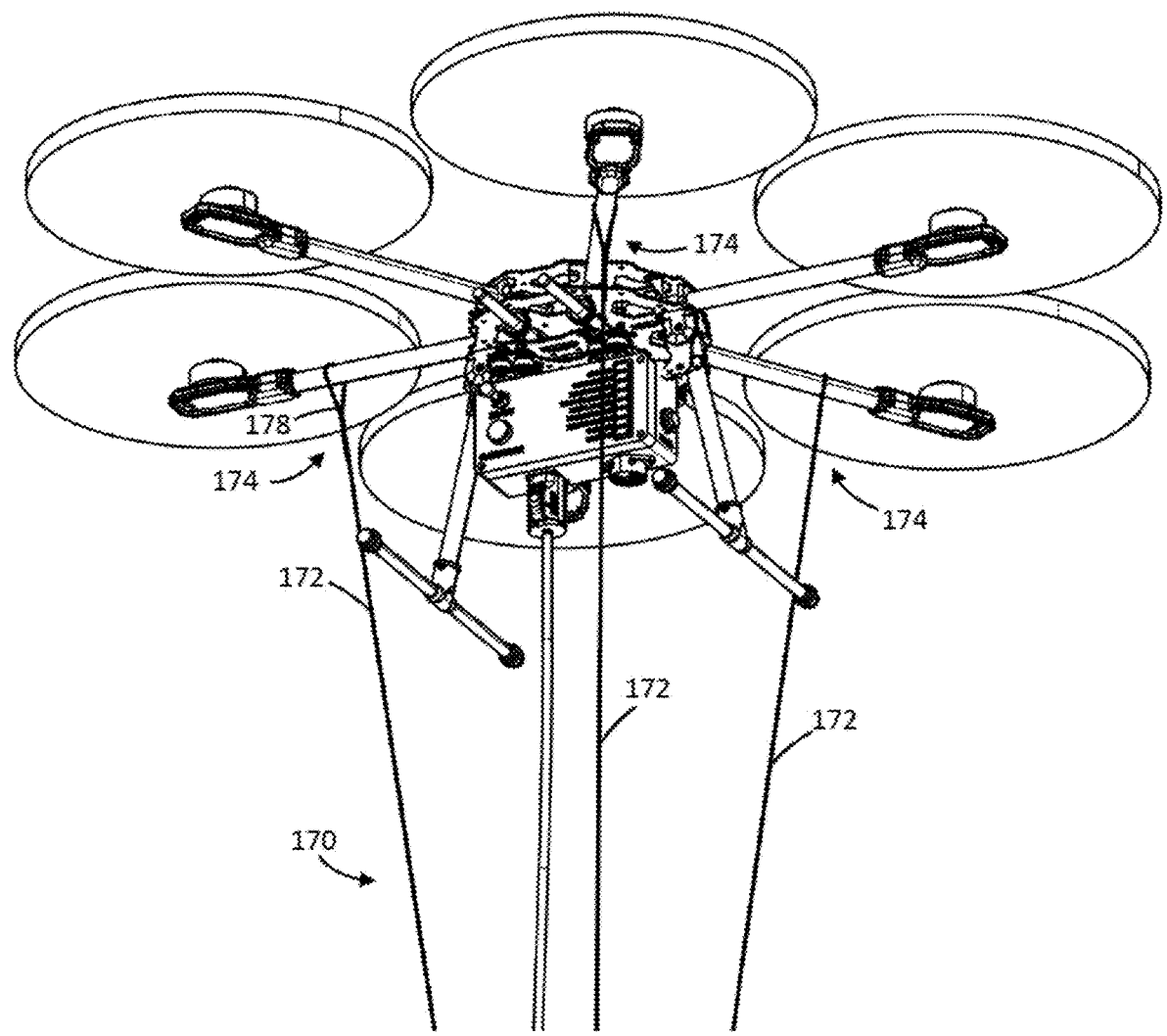
FIGS. 4A and 4B are front perspective views of portions of a suspension device for suspending a sludge level detection tool from a drone.
Figure 4B:
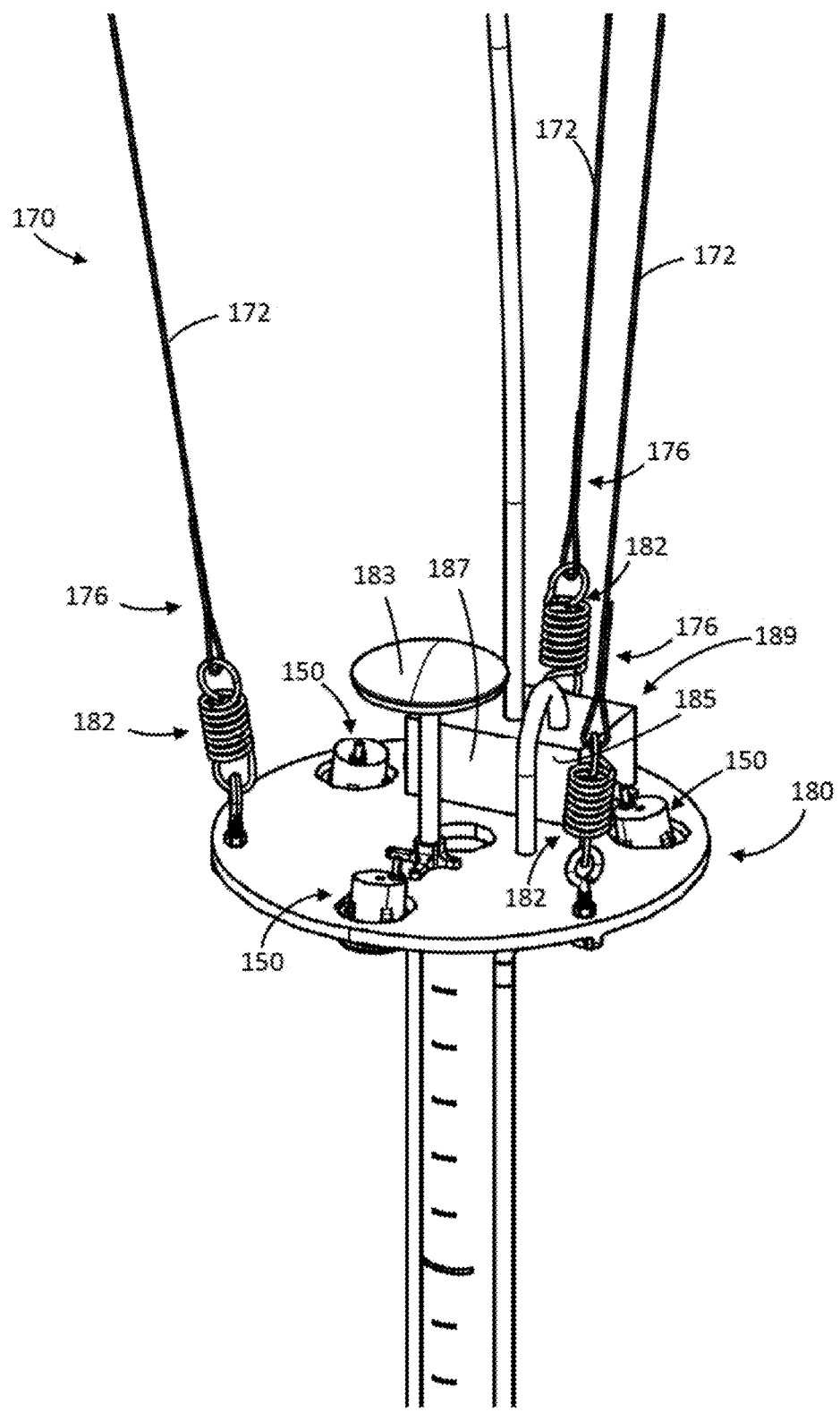

An example of a suspension device 170 is shown in FIGS. 4A and 4B. In the example illustrated, the suspension device 170 includes at least two cables 172, preferably three, that extend between a first end 174 and a second end 176. Each of the first ends 174 are connected to the drone 102 at a respective drone link 178. Each of the second ends 176 connects to link 182 which interconnects the sludge level detection tool 104 to the drone 102 through an intermediate platform 180.

In the example illustrated in FIGS. 4A and 4B, the suspension device includes a tension spring 182 to absorb shocks and/or reduce vibration.

In the example illustrated, the drone links 178 are releasably securable to the drone 102. Accordingly, the suspension device 170 may be detached from the drone 102 when not in use. In some examples, as shown, the drone links 178 may be remotely operable. That is, a remote signal may cause the drone links 178 to break, releasing the sludge level detection tool 104 from the drone 102. It may be desirable to remotely signal the drone link 178 to release the sludge level detection tool 104 if a problem occurs during operation of the sludge level detection system 100 (e.g., the sludge level detection tool 104 gets lodged in the sludge).

As better illustrated on FIG. 4B, intermediate platform 180 provides an interface between the drone 102 and the sludge detection tool 104. Further advantageously, the platform 180 receives the at least one sonar sensor 150. Further advantageously, the platform 180 receives a GPS system 185 and associated antenna 183. Even more advantageously, the GPS system 185 and an optional gyroscope 187 are housed in a housing 189.

Optionally the cable 172 may be stainless-steel and may further be coated with a plastic sheath to prevent corrosion.

In either embodiment described herein, it will be apparent to a person skilled in the art that a power source aboard the drone 102 is connected to the various sensors, valve and camera (in the first embodiment, since in the second embodiment, the float-camera is advantageously provided with a separate power source). The power source (not shown) can be an independent power source, or can be power generated by the drone 102 itself.

A conduit 129 is provided along the gauge 106 and adapted to be interconnected at a bottom part of the gauge 106 and a top part of the gauge 106. Further advantageously, in the embodiment where the tool 104 is provided with a pressure sensor and/or a pH sensor, either one or both of these sensors connect to the drone 102 through a separate conduit 131, preferably located diametrically opposed to the conduit 126. In such an advantageous configuration, the float-camera 122 may further be configured to have an internal shape sized and configured to generally espouse a cross-sectional shape of the gauge 106 and the conduits 129, 131 as shown in FIG. 2B. This configuration further stabilizes the float-camera 122 and prevents rotational movement of the float-camera 122 about a longitudinal axis of the gauge 106.

Accordingly, it is to be understood that the systems and methods described herein may allow operators to collect more accurate information, and under safer conditions than the equipment traditionally used. The time savings brought by the systems described herein may allow an operator to obtain a plurality of sludge levels at various measurement sites for the creation of a three-dimensional map of sludge level, where each sample is geo-located. Further, use of a drone 102 to transport the sludge level detection tool 104 may allow for a single measurement site to be tested multiple times to provide historical analysis of the sludge level at that measurement site.

While the above description provides examples of the embodiments, it will be appreciated that some features and/or functions of the described embodiments are susceptible to modification without departing from the spirit and principles of operation of the described embodiments. Accordingly, what has been described above has been intended to be illustrative of the invention and non-limiting and it will be understood by persons skilled in the art that other variants and modifications may be made without departing from the scope of the invention as defined in the claims appended hereto. The scope of the claims should not be limited by the preferred embodiments and examples but should be given the broadest interpretation consistent with the description as a whole.

Items

Item 1. An aerially controlled sludge level detection system for determining a sludge level in a wastewater reservoir, the system comprising:
a drone and a sludge level detection tool suspended from the drone, the drone operable to lower the sludge level detection tool into the wastewater reservoir and raise the sludge level detection tool out of the wastewater reservoir,
the sludge level detection tool having
a longitudinally extending gauge extending from a proximal end located toward the drone and a distal end located away from the drone, at least a portion of the gauge at the distal end is hollow to allow a volume of a fluid and a volume of the sludge from within the wastewater reservoir to enter the gauge when lowered into the wastewater reservoir; and
an analyzer connected to the gauge for analyzing the volume of the fluid and the volume of the sludge within the gauge.

Item 2. The system of any preceding item, wherein the analyzer is a camera located within the portion of the gauge that is hollow.

Item 3. The system of any preceding item, wherein the camera faces toward the distal end.

Item 4. The system of any preceding item, wherein the distal end of the gauge comprises a valve, the valve moveable between an open position and a closed position, wherein when in use the valve is in an open during lowering of the sludge level detection tool into the wastewater reservoir and a closed position during raising of the sludge level detection tool out of the wastewater reservoir. Preferably, the inner diameter of the tool is substantially constant along a portion of its length that enters the water, which facilitates ingress of water therein, and prevents the creation of turbulence in the water as the tool is being lowered into the basin.

Item 5. The system of any preceding item, wherein the analyzer is a float-camera slidably mounted to an outer surface of the gauge, the float-camera floatable on an upper surface of the fluid within the wastewater reservoir when the gauge is lowered into the wastewater reservoir and raised from the wastewater reservoir by the drone.

Item 6. The system of any preceding item, wherein the distal end of the gauge comprises an infrared probe, the infrared probe detects an upper surface of the sludge as the sludge level detection tool is lowered into the wastewater reservoir by the drone.

Item 7. The system of any preceding item, wherein the gauge further comprises a port extending between the outer surface of the gauge and a cavity defined by the hollow portion of the gauge to vent air from the cavity during lowering of the sludge level detection tool into the wastewater reservoir.

Item 8. The system of any preceding item, wherein the port is positioned at the proximal end of the gauge.

Item 9. The system of any preceding item, wherein the proximal end of the gauge comprises a distance sensor for detecting an upper surface of the fluid within the wastewater reservoir, the distance sensor signals the drone to stop lowering the sludge level detection tool into the wastewater reservoir when the distance sensor detects the upper surface of the fluid to be within a threshold limit.

Item 10. The system of any preceding item, wherein the tool is further provided with a pressure sensor.

Item 11. The system of any preceding item, wherein the gauge comprises at least two longitudinally extending segments releasably connected to each other.

Item 12. The system of any preceding item, wherein a first segment and at least a portion of a second segment of the at least two longitudinally extending segments are hollow and are in fluid communication to allow the volume of the fluid to enter each of the first segment and the second segment.

Item 13. The system of any preceding item, wherein sludge level detection tool is releasably suspended by a suspension device to the drone, the suspension device remote controllable to release the sludge level detection tool.

Item 14. The system of any preceding item, wherein the suspension device comprises a tension sensor for detecting when the distal end of the gauge contacts a lower surface of the wastewater reservoir.

The invention claimed is:

1. An aerially controlled sludge level detection system for determining a sludge level in a wastewater reservoir, the system comprising:
   a drone and a sludge level detection tool suspended from the drone, the drone operable to lower the sludge level detection tool through fluid contained in the wastewater reservoir and into sludge located below a surface of the wastewater reservoir and raise the sludge level detection tool out of the wastewater reservoir,
   the sludge level detection tool comprising:
      a longitudinally extending gauge extending from a proximal end located toward the drone and a distal end located away from the drone, at least a portion of the gauge at the distal end is hollow to allow a volume of the fluid and a volume of the sludge from within the wastewater reservoir to enter the gauge when the sludge level detection tool is lowered into the wastewater reservoir;
      at least one sludge detection sensor operable to detect a sludge location of the sludge below the surface of the wastewater reservoir with the at least one sludge detection sensor submerged within the wastewater reservoir; and
      an analyzer connected to the gauge for analyzing the volume of the fluid and the volume of the sludge within the gauge, wherein the analyzer is configured to determine the sludge level of the sludge within the wastewater reservoir by analyzing the volume of the sludge within the gauge.

2. The system of claim 1, wherein the analyzer comprises a camera.

3. The system of claim 2, wherein the camera is located within the portion of the gauge that is hollow and faces toward the distal end.

4. The system of claim 1, wherein the gauge comprises a valve, the valve moveable between an open position and a closed position, wherein when in use the valve is in the open position during lowering of the sludge level detection tool into the wastewater reservoir and the closed position during raising of the sludge level detection tool out of the wastewater reservoir.

5. The system of claim 2, wherein the camera comprises a float-camera slidably mounted to an outer surface of the gauge, the float-camera floatable on an upper surface of the fluid within the wastewater reservoir when the gauge is lowered into the wastewater reservoir and raised from the wastewater reservoir by the drone.

6. The system of claim 4, wherein the gauge further comprises a port extending between an outer surface of the gauge and a cavity defined by the hollow portion of the gauge to vent air from the cavity during lowering of the sludge level detection tool into the wastewater reservoir.

7. The system of claim 6, wherein the port is positioned at the proximal end of the gauge.

8. The system of claim 1, wherein the at least one sludge detection sensor comprises an infrared probe, the distal end of the gauge comprises the infrared probe, and the infrared probe is operable to detect an upper surface of the sludge as the sludge level detection tool is lowered into the wastewater reservoir by the drone.

9. The system of claim 1, wherein the proximal end of the gauge comprises a distance sensor for detecting an upper surface of the fluid within the wastewater reservoir, wherein the distance sensor is operable to signal the drone to stop lowering the sludge level detection tool into the wastewater reservoir when the distance sensor detects the upper surface of the fluid to be within a threshold limit.

10. The system of claim 1, wherein the gauge comprises at least two longitudinally extending segments releasably connected to each other.

11. The system of claim 10, wherein a first segment and at least a portion of a second segment of the at least two longitudinally extending segments are hollow and are in fluid communication to allow the volume of the fluid to enter each of the first segment and the second segment.

12. The system of claim 1, wherein sludge level detection tool is releasably suspended by a suspension device to the drone, the suspension device remote controllable to release the sludge level detection tool.

13. The system of claim 12, wherein the suspension device comprises a tension sensor for detecting when the distal end of the gauge contacts a lower surface of the wastewater reservoir.

14. The system of claim 1, further comprising an onboard control module operable to control operation of the analyzer.

15. The system of claim 14, wherein the onboard control module comprises a wireless transceiver operable to communicate with a remote operator system.

16. The system of claim 14, wherein the onboard control module is operable to calculate at least one of a sludge level or a sludge depth based on data received from the analyzer.

17. The system of claim 1, wherein the gauge comprises graduated markings at regular intervals along the gauge and the analyzer is operable to visually determine the sludge level using the graduated markings.

18. A sludge level detection system for determining a sludge level in a wastewater reservoir, the system comprising:
   a vehicle and a sludge level detection tool suspended from the vehicle, the vehicle operable to lower the sludge level detection tool through fluid contained in the wastewater reservoir and into sludge located below a surface of the wastewater reservoir and raise the sludge level detection tool out of the wastewater reservoir,
   the sludge level detection tool comprising:
      a longitudinally extending gauge extending from a proximal end located toward the vehicle and a distal end located away from the vehicle, at least a portion of the gauge at the distal end is hollow to allow a volume of the fluid and a volume of the sludge from within the wastewater reservoir to enter the gauge when the sludge level detection tool is lowered into the wastewater reservoir, wherein the gauge further comprises a port extending between an outer surface of the gauge and a cavity defined by the hollow portion of the gauge to vent air from the cavity during lowering of the sludge level detection tool into the wastewater reservoir; and
      an analyzer connected to the gauge for analyzing the volume of the fluid and the volume of the sludge within the gauge, wherein the analyzer is configured to determine the sludge level of the sludge within the wastewater reservoir by analyzing the volume of the sludge within the gauge.

19. The system of claim 18, wherein the gauge comprises a valve, the valve moveable between an open position and a closed position, wherein when in use the valve is in an open position during lowering of the sludge level detection tool into the wastewater reservoir and a closed position during raising of the sludge level detection tool out of the wastewater reservoir.

20. The system of claim 18, further comprising an onboard control module operable to control operation of the analyzer.

21. The system of claim 18, wherein the onboard control module is operable to calculate at least one of a sludge level or a sludge depth based on data received from the analyzer.

22. A method for determining a sludge level in a wastewater reservoir, the method comprising:
   positioning, using a drone, a sludge level detection tool at a measurement site above the wastewater reservoir, wherein the sludge level detection tool comprises a longitudinally extending gauge extending from a proximal end located toward the drone and a distal end located away from the drone, and wherein at least a portion of the gauge at the distal end is hollow;
   lowering the sludge level detection tool through fluid contained in the wastewater reservoir and into sludge located below a surface of the wastewater reservoir while the sludge level detection tool is positioned at the measurement site suspended from the drone whereby the hollow portion of the gauge allows a volume of the fluid and a volume of the sludge from within the wastewater reservoir to enter the gauge;
   determining, using at least one sludge detection sensor, that the sludge level detection tool has reached a bottom of the wastewater reservoir; and
   visually determining the sludge level of the sludge within the wastewater reservoir by analyzing the volume of the sludge within the gauge using graduated markings on the sludge level detection tool.

* * * * *